Jan. 20, 1959   L. O. CARLSEN ET AL   2,869,427
MACHINE AND METHOD FOR PRODUCING TAPERED GEARS
Filed Aug. 6, 1953   6 Sheets-Sheet 1

INVENTORS
LEONARD O. CARLSEN
WILLIAM C. CRITCHLEY
CHARLES F. MAGEE
BY Richard W. Treverton
ATTORNEY INVENTORS
LEONARD O. CARLSEN
WILLIAM C. CRITCHLEY
CHARLES F. MAGEE
BY Richard W. Treverton
ATTORNEY

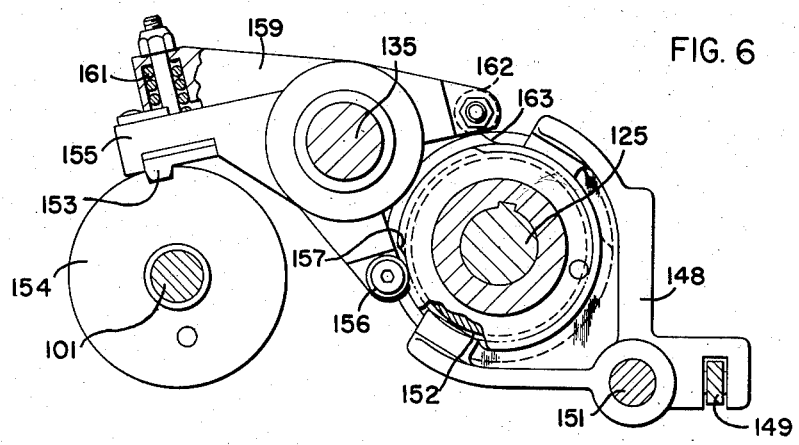
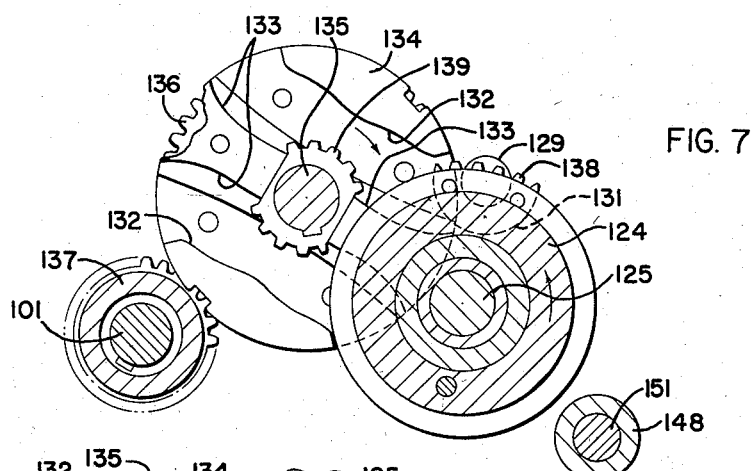
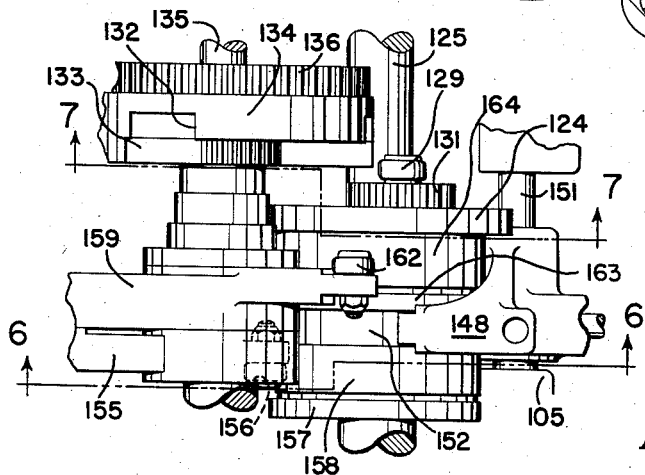

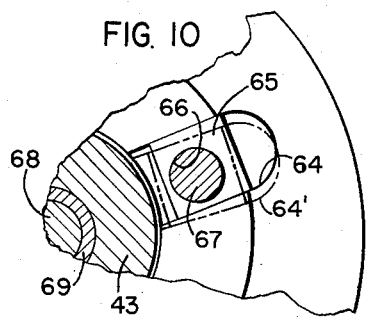
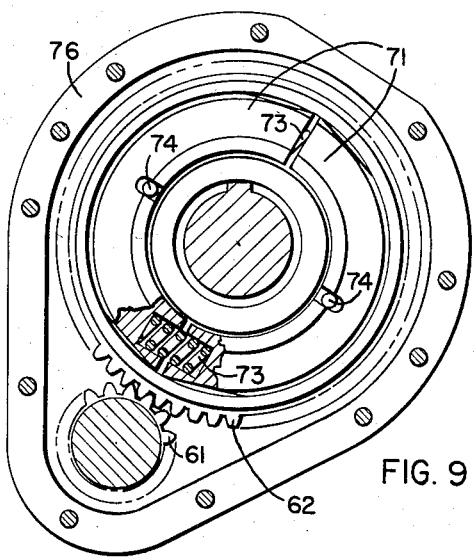
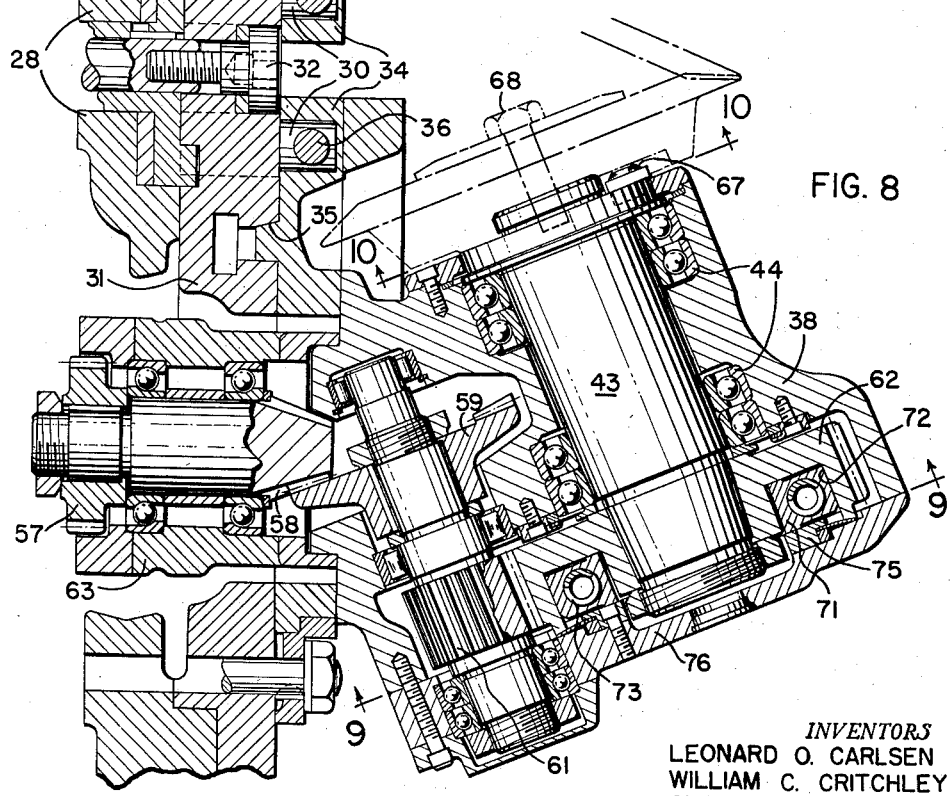
*INVENTORS*
LEONARD O. CARLSEN
WILLIAM C. CRITCHLEY
CHARLES F. MAGEE
BY Richard W. Treverton
*ATTORNEY*

Jan. 20, 1959     L. O. CARLSEN ET AL     2,869,427
MACHINE AND METHOD FOR PRODUCING TAPERED GEARS
Filed Aug. 6, 1953     6 Sheets-Sheet 6

INVENTORS
LEONARD O. CARLSEN
WILLIAM C. CRITCHLEY
CHARLES F. MAGEE
ATTORNEY

United States Patent Office 2,869,427
Patented Jan. 20, 1959

2,869,427

MACHINE AND METHOD FOR PRODUCING TAPERED GEARS

Leonard O. Carlsen, Rochester, William C. Critchley, Brighton, and Charles F. Magee, Rochester, N. Y., assignors to The Gleason Works, Rochester, N. Y., a corporation of New York Application August 6, 1953, Serial No. 372,623

20 Claims. (Cl. 90—3)

The present invention relates to a machine and method for producing gears, particularly but not exclusively tapered gears, certain aspects of the invention being applicable only to a machine for generating straight toothed gears but others being applicable also to machines for generating curved tooth gears including spiral bevel and hypoid gears.

The invention contemplates the kind of machine which has a movable carrier which in a bevel gear machine takes the form of a rotatable cradle, a tool support and a rotatable work spindle of which either one or the other is mounted on the carrier, and means for alternately rotating the work spindle and moving the carrier in opposite directions in timed relationship so that a tool on the support may represent one or more tooth surfaces of a generating gear that is rolling in mesh with a work gear on the spindle. The tool support and work spindle are also relatively movable, rectilinearly, in a direction depthwise of the cut. With machines of this kind it has heretofore been known to rough and finish cut gears in one operating sequence, by first bringing the tool support and work spindle into position for rough cutting at full depth, then rough cutting during relative generating motion of the carrier and work spindle in one direction, then effecting a slight relative infeed of the tool support and spindle, and finally, finish cutting on the return generating motion.

One feature of the invention is an improvement in the cutting cycle whereby a depth feed is effected during a dwell in the generating motion in one direction that occurs at an intermediate point between the beginning and the center of the generating motion. After this depth feed, which positions the tool support and work spindle for cutting at nearly full depth, the generation is continued with the result that the tooth surfaces are roughed out close to finish size, leaving only a slight amount of stock for finish cutting. This action is followed by a further infeed of the small amount necessary to position the tool support and work spindle for cutting at full depth, and then by the return generating motion during which the tooth surfaces are finish cut. With this mode of operation a major part of the stock is removed efficiently by plunge cutting during the initial infeed, and the rough cutting generation, while not entirely complete, is so nearly complete as to leave a substantially uniform thickness of stock for finish cutting, with the result that good surface finish is obtained. During the initial infeed a large part of the cutting load is borne by the tip edges of the tools, thereby prolonging the life of the side edges of the tools which finish cut the working surfaces of the gear teeth. Another advantage is that the initial part of the roughing generating action, preceding the dwell during which the plunge cutting occurs, may be utilized for relatively withdrawing the tool support from the work spindle and for then effecting an indexing rotation of the latter to bring successive tooth surfaces of the work into cutting position.

Another feature of the invention, applicable to machines for generating either straight or curved tooth gears, concerns a means for improving the efficiency of the cutting cycle by reducing the part of it that is devoted to indexing the work spindle. This feature of the invention contemplates a machine of the kind having a generating train connecting the work spidle and carrier or cradle, a unidirectionally rotatable cam for oscillating the generating train, means operable by the cam for oscillating the generating train, means connected to the generating train and including an intermittent drive mechanism having rotatable drive and driven members for periodically rotating the work spindle relative to the carrier or cradle, and means connecting the cam and the drive member for rotation. With this arrangement, as employed in prior machines, a large part of the operating cycle must be devoted to indexing, since the cam makes only one revolution per cycle (i. e. per tooth or tooth space of the gear being cut) and the drive member, which also makes one revolution per cycle, must make a substantial fraction of one turn for indexing. According to the present invention the same cam which oscillates the generating train is provided with a cam track for effecting a relative axial shifting of the drive and driven members so that they are engageable with each other during only a part of each revolution of the cam. This enables the drive member to be geared to make more than one turn (three turns in the preferred embodiment) for each revolution of the cam, so that the part of the cycle required for indexing is proportionately reduced.

In the preferred machine embodiment for cutting straight bevel gears, the tool support is mounted on the cradle, and the tools comprise a pair of rotary disc cutters arranged to operate simultaneously in the same tooth space of the work. Each cutter has radial blades which extend into the inter-blade spaces of the other cutter, so that the cutters must be kept in predetermined phase relation to each other. The cutters are geared together for rotation but they must be adjustable to various positions relative to the cradle in order to adapt the machine for cutting bevel gears of different sizes and shapes, and one such adjustment has the effect of rotating one cutter out of phase relationship to the other cutter. In order to compensate for this the invention provides a novel means for keying one cutter to its spindle in any of a plurality of different angular positions.

The interlocking of the cutter blades, i. e. the projection of the blades of each cutter into the interblade spaces of the other cutter, requires the blades on each cutter to be widely spaced. Therefore when cutting a gear of relatively narrow face width one blade will leave the cut before the next blade of the same cutter enters, and this places an intermittent load on the cutter drive train which results in undue noise and wear on the drive gears in the train. To correct this condition the present invention provides a brake means, acting between each cutter spindle and the head in which it is journaled for rotation, to keep the drive train always under a load in one direction.

The foregoing and other objects and advantages of the invention will appear from the following description made with reference to the machine for cutting straight bevel gears which is shown in the drawings, wherein:

Fig. 5 is a fragmentary plan view showing a part of the index mechanism;

Figure 11:
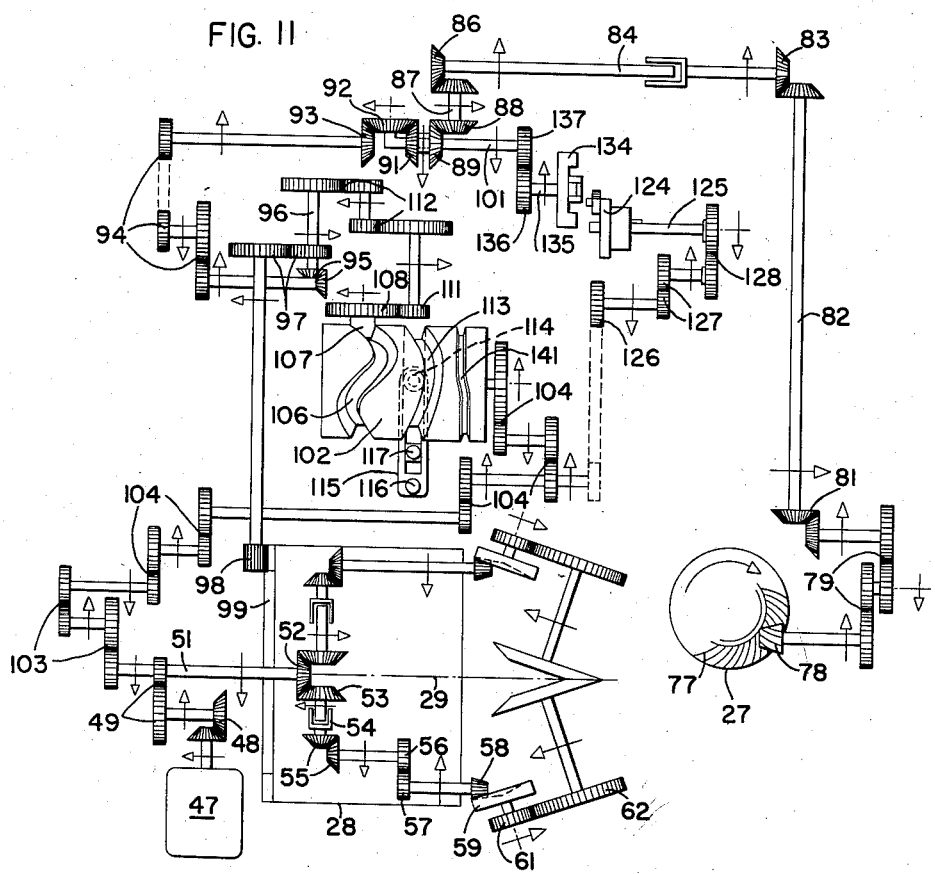
Figure 12:
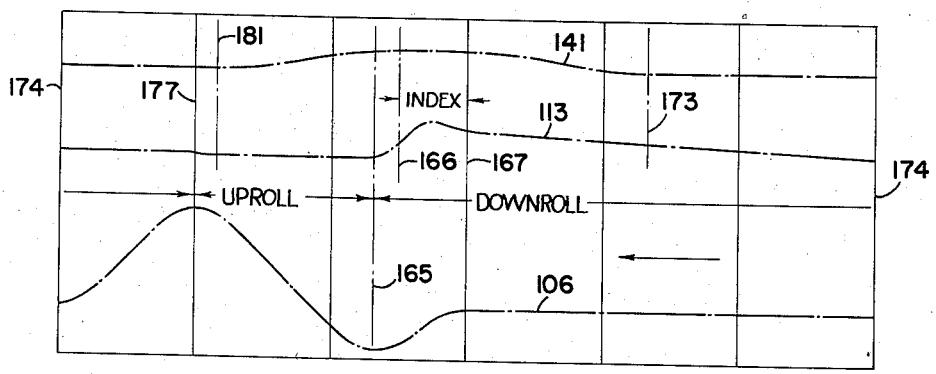

Figs. 6 and 7 are vertical sectional views taken approximately in the planes indicated by section lines 6—6 and 7—7 in Fig. 5;

Fig. 8 is a sectional view through one cutter head and the supporting structure therefor, in a plane axial of the cutter spindle;

Fig. 9 is a sectional view approximately in the plane indicated by section line 9—9 in Fig. 8;

Fig. 10 is a sectional view taken approximately in the plane indicated by section line 10—10 in Fig. 8, showing a cutter installed on the cutter spindle;

Fig. 11 is a drive diagram of the machine;

Fig. 12 is a cycle diagram showing the relation to each other of the several motions effected by the main drive cam; and, Figs. 13 to 15, inclusive, are diagrammatic views illustrating the relation of the cutter and a work gear in successive phases of a cutting cycle.

Figure 1:
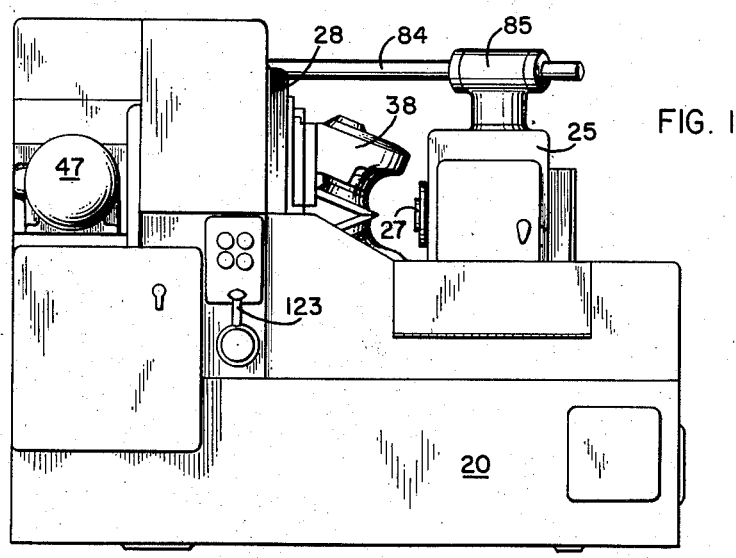
Fig. 1 is a front elevation of the machine.
Figure 2:
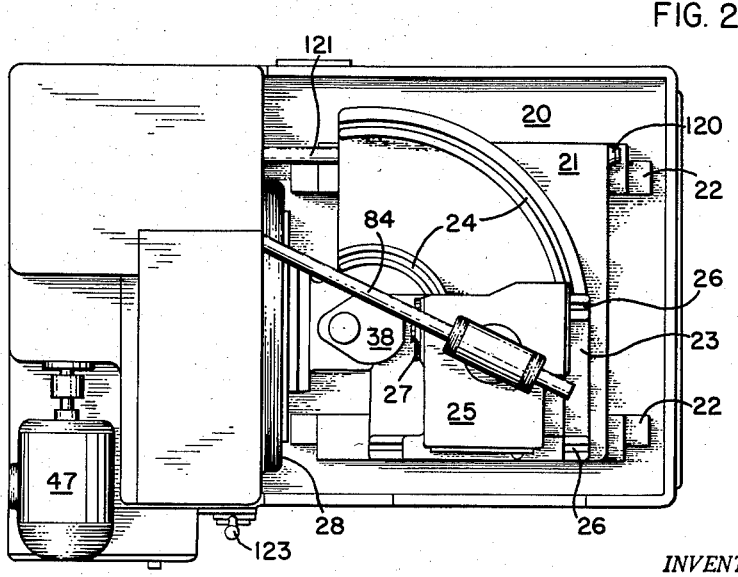
Fig. 2 is a plan view of the machine.
Figure 3:
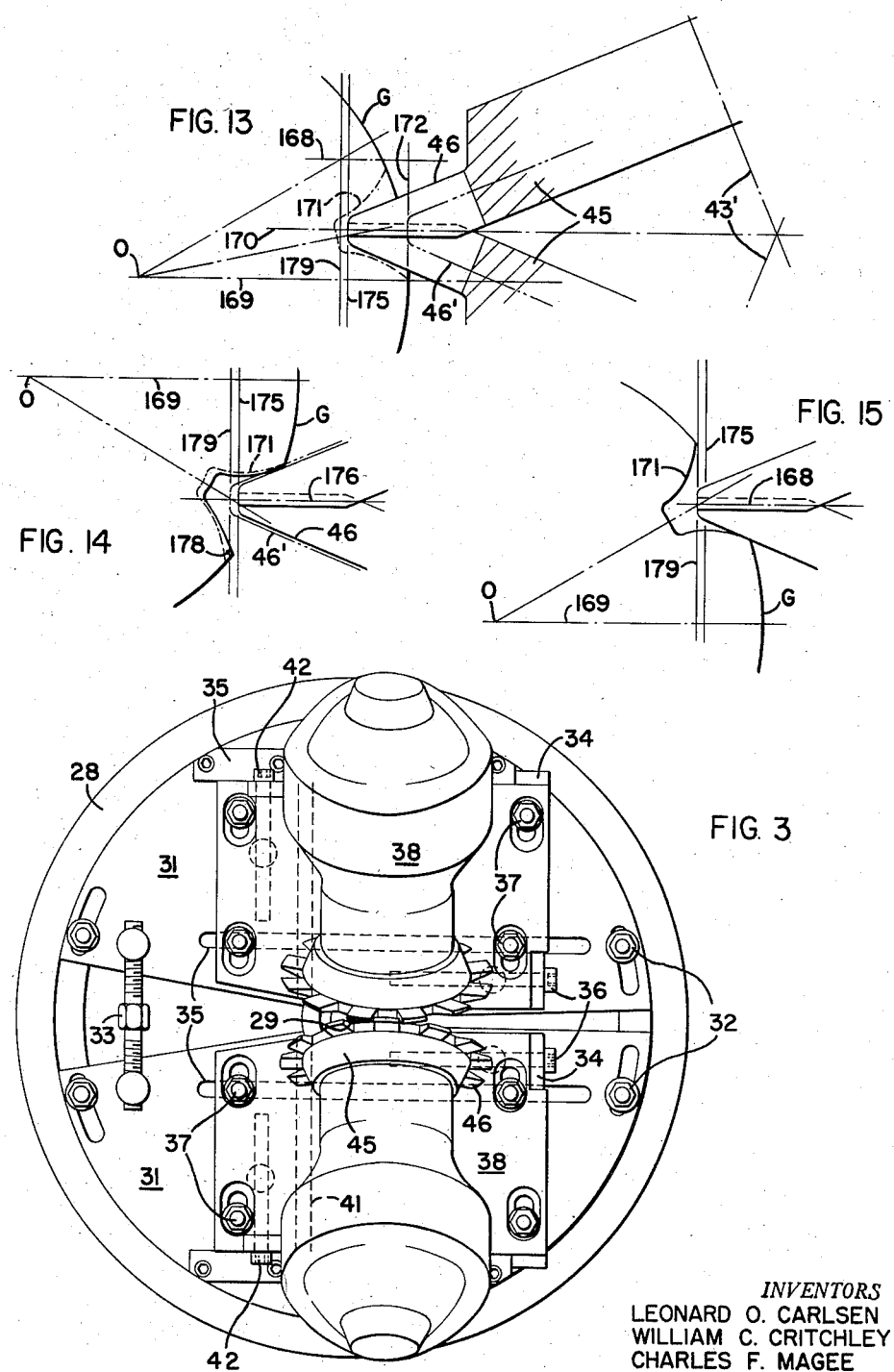
Fig. 3 is a fragmentary end elevation of the cradle, showing the structure by which the tool heads are mounted thereon.

As shown in Figs. 1 to 3, inclusive, the machine has a frame 20 on which a sliding base 21 is mounted for movement along ways 22. A swinging base 23 is adjustable angularly on sliding base 21, along ways 24 of the latter, and a work head 25 is adjustable rectilinearly along ways 26 of the swinging base. A work spindle 27, for supporting a work gear to be cut, is journaled in the head 25 for rotation about a horizontal axis.

A carrier or cradle 28 is rotatable on the frame about a horizontal axis 29 which intersects the axis of spindle 27. Angularly adjustable on the cradle, about the axis 29, are a pair of plates 31. These plates are secured to the cradle by means of screws 32 after they are adjusted angularly by means of a turnbuckle 33, which, when turned, acts to move whichever one of the plates has its screws 32 loosened. Mounted upon each plate 31 is one member of a pair of slides 34, each adjustable along a guideway 35. The adjustment is effected by turning an adjusting screw 36 when clamping screws 37 are loosened. The screws 36 are rotatable in their respective slides and are screw-threaded to nuts 30 that are anchored to the respective plates 31. Each cutter head, designated 38, has flanges that are clamped to the adjacent one of the slides 34 by the screws 37. Each screw 37 extends through a flange of the cutter head and slide 34, and is threaded to a plate 31. When screws 37 are loosened the cutter heads may be adjusted upon slides 34 along guideways 41 by turning adjusting screws 42, these being rotatable in the respective cutter heads and screw-threaded to nuts (not shown) anchored in the respective slides.

In each cutter head 38 is a cutter spindle 43 journaled for rotation about its axis 43' on anti-friction bearings 44 (Fig. 8). To each cutter spindle is secured one member of a pair of interlocking disc cutters 45. Each cutter has radial blades 46 which extend into the inter-blade spaces of the other cutter, so that blades of both cutters can operate simultaneously in the same tooth space of the work, as is best shown in Fig. 13. The drive for the cutters (Figs. 8 and 11) includes a motor 47, bevel gears 48, change gears 49 whereby the cutter speed may be varied, shaft 51 about whose axis 29 the cradle 28 is rotatable, and a bevel gear 52 on shaft 51. One cutter (the lower one in Fig. 11) is driven from gear 52 through bevel gear 53, telescoping shaft 54, bevel gears 55, spur gears 56 and 57, bevel gears 58 and 59, spur pinion 61 on the same shaft as bevel gear 59, journaled on anti-friction bearings in head 38, and spur gear 62 on the cutter spindle 43. The other cutter is driven from gear 52 through a train that is similar except that it omits gears 56, 57 in order that the direction of rotation of both cutters may be the same.

The pinion 58 (and also the gears 55, 57 and the driven member of pair 55) is journaled for rotation in a swivel housing 63 that is rigidly secured to cutter head 38. Gear 53 is journaled in a housing that is rotatable around shaft 51, while the drive member of gear pair 55 is journaled in a housing that is rotatable around the shaft of gear 56. This arrangement of the two cutter drive trains, including the telescoping shafts 54, accommodates adjustments of cutter heads together with their slides 34 along guideways 35. Since the cutter heads are always adjusted into symmetrical positions relative to the cradle axis 29 except when cutting bevel gears with skew teeth, these adjustments usually do not affect the phase relationship of the cutters. However, adjustment of plates 31 relative to each other about axis 29 results in a relative rotation of the two cutters such as might cause their interlocking blades 46 to interfere with each other. For this reason at least one of the cutters is made angularly adjustable on its spindle 43.

As shown in Figs. 8 and 10 the inner face of the cutter is provided with a radial keyway 64 adapted to receive a square key 65 which has an eccentric opening 66. Fitting into this opening is a pin 67 that is anchored to the cutter spindle. The cutter is secured to the spindle by a screw 68 that is threaded into a hardened insert 69 in the spindle. The cutter may be adjusted to different angular positions on the spindle by removing it and turning the key. For example if the key is turned by 90° (clockwise) from the position shown in full lines, then the cutter, when replaced on the spindle, will be turned to bring its keyway to the position shown by broken lines at 64'. By locating the opening 66 at a different distance from each of the four sides of the square key, it is possible to adjust the cutter to four different positions upon the spindle.

As shown in Fig. 3, the cutter blades 46 are spaced substantially so that only one blade at a time may be in cutting engagement with a work gear. To avoid chatter of the gears in the cutter drive train, semi-circular brake shoes 71 (Figs. 8 and 9) are arranged in an annular groove 72 in the gear 62. The shoes are urged radially outwardly by springs 73 to engage the outer cylindrical surface of the groove. They are held against rotation by pins 74 which are anchored to a ring 75 that is secured to the cover 76 of the cutter head. By lightly resisting the rotation of the cutter spindle, the brake shoes keep the cutter drive train always under load in one direction, thereby eliminating noise and vibration.

The generating train connecting work spindle 27 and cradle 28 for rotation in timed relationship is shown in Fig. 11. It includes a hypoid gear 77 on the spindle, a drive pinion 78, index change gears 79, bevel gears 81 and shaft 82, all of which are housed within the work head 25. On the upper end of shaft 82 is a bevel gear meshing with a bevel pinion 83 that is on one end of a telescoping shaft 84 and is housed within a swivel head 85. On the other end of the telescoping shaft is a bevel gear 86 meshing with a bevel gear on a shaft 87 that is journaled in the frame 20, the gear 86 being within a swivel head that is rotatable about the axis of shaft 87. The generating train further includes a bevel gear 88 on shaft 87, bevel gear 89, differential gears 91, 92 and 93, ratio-of-roll change gears 94, bevel gears 95, shaft 96, spur gears 97 and a hypoid pinion 98 meshing with a hypoid ring gear 99 on the cradle 28, all of these elements being within the frame 20 of the machine. When the index 101, which is connected to the spider carrying differential planet gear 92, is stationary, the work spindle and cradle will rotate in constant velocity ratio, the value of this ratio depending upon the ratio-of-roll change gears 94 and the index change gears 79.

Figure 4:
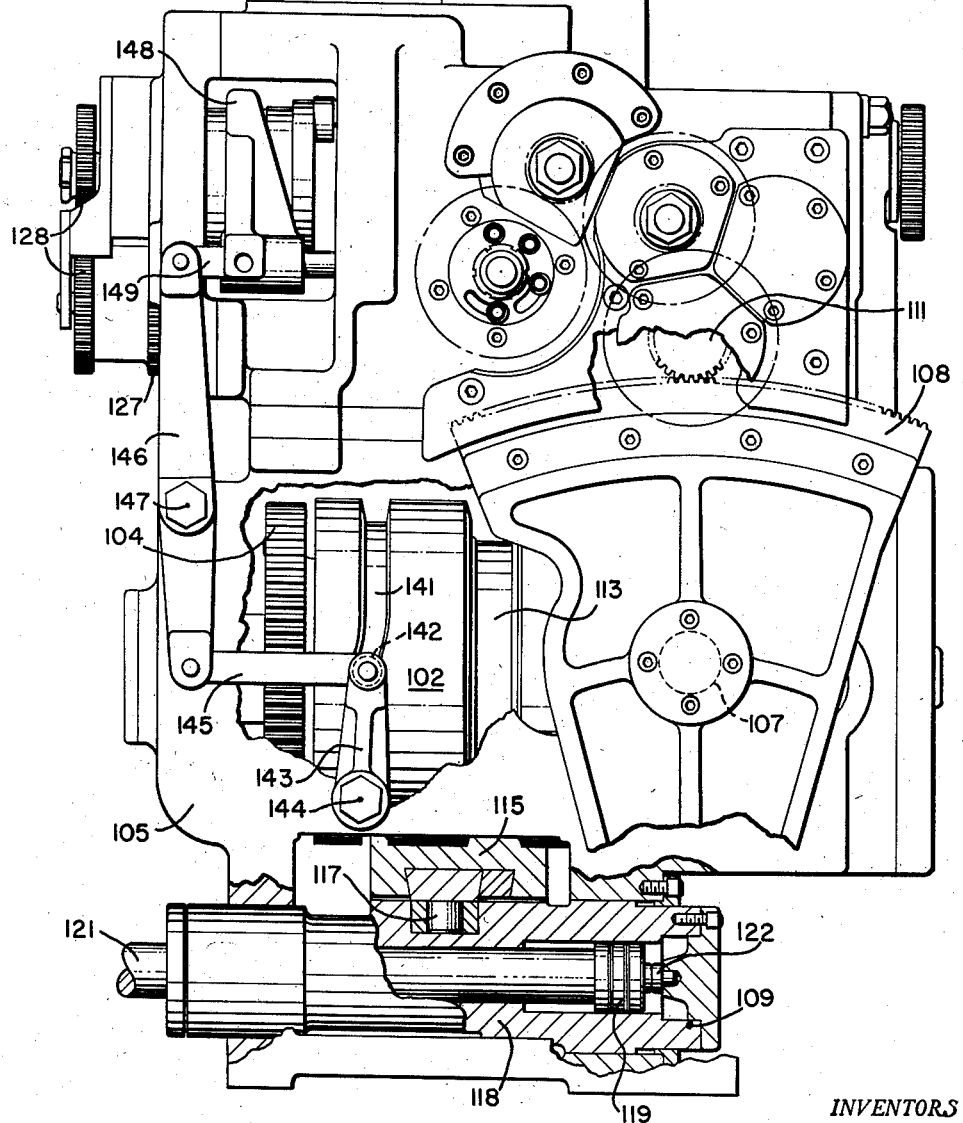
Fig. 4 is an elevation, partly in section, of the main cam drive and index assembly.

For rotating the generating train alternately in opposite directions a main drive cam 102 is provided. During operation of the machine this cam is rotated continuously in one direction by motor 47 through shaft 51, rate-of-roll change gears 103, and the five pairs of spur gears designated 104. The cam is mounted in a bracket 105 (Fig. 4) within the frame and has a continuous cam track 106 in which rides a roller 107 carried by a gear segment 108, this segment being pivoted to the bracket on axis 109. The segment meshes with a pinion 111 that is connected through angle-of-roll change gears 112 to shaft 96 of the generating train. During each revolution of cam 102, at a rate that is determined by the ratio of change gears 103, the gear segment 108 makes one oscillation, always through the same angle; but the shaft 96 (and all of the other elements of the generating train) is oscillated through an angle which depends upon the ratio of change gears 112. This ratio is chosen in accordance with the angle through which the cradle and work spindle must rotate in order to fully generate the tooth profile of a particular work gear.

Depthwise infeed of the cutters relative to the work, and withdrawal to permit indexing the work after each tooth space is cut, is effected by another continuous track on the cam, designated 113. Engaged in this track is a follower roller 114 on a lever 115 that is pivoted to bracket 105 by a pin 116, Fig. 11. On the lever is an adjustable block carrying a pivot pin 117 which turns in a block that is seated in a transverse groove in a cylinder 118, Fig. 4. The cylinder is slidable axially in the bracket 105 and contains a piston 119 whose rod 121 is adjustably connected to the sliding base 21 (see Fig. 2). During cutting operation of the machine the piston 119 is held against a stop 122 on the head of cylinder 118 by hydraulic pressure (supplied by a suitable hydraulic system, not shown), so that the cylinder 118 and rod 121 are moved as a unit, to advance and withdraw the slide 21 and the work head 25 mounted on it, by the lever 115 when the latter is swung by cam track 113 upon rotation of cam 102. The amplitude of this advance and withdraw may be varied by adjusting longitudinally on lever 115 the block which carries pin 117. In order to more fully withdraw the work head for the purpose of chucking or dechucking a work gear, the hydraulic system may be operated by turning valve lever 123 (Figs. 1 and 2), to shift piston 119 to its limit position away from stop 122. The rod 121 may be adjusted axially relative to sliding base 21 by turning a calibrated screw-threaded member 120 (Fig. 2).

Indexing of the work spindle is effected periodically, once during each rotation of cam 102, by rotating through one turn the normally stationary shaft 101 that carries the differential planet gear 92. This indexing action is effected by mechanism shown in Figs. 4 to 7 and 11, which includes a Geneva drive wheel 124 keyed for axial motion upon a shaft 125 that is rotatable in bracket 105. Shaft 125 is rotated constantly, in time with cam 102, by means including a gear 126 meshing with one of gears 104, and gears 127 and 128. Wheel 124 carries a drive pin 129 and a semi-circular part 131 for respectively engaging side walls 132 and 133 of two generally parallel face slots provided in a Geneva driven wheel 134. The latter is mounted on a shaft 135 for rotation in bracket 105 and carries a gear 136 meshing with a pinion 137 on the shaft 101.

The arrangement is such that, when the drive wheel 124, rotating in the direction of the arrow in Fig. 7, is positioned axially so that drive parts 129 and 131 are in the same plane of rotation with slot surfaces 132 and 133, said drive parts will during each revolution engage in one of the slots and turn the driven wheel through one half turn. In this action the drive parts 129, 131 enter one end of the slot and pass completely through it, departing from its opposite end. When at the middle of the slot, gear teeth 138 on the semi-circular part 131 mesh with teeth 139 on the hub of wheel 134 to provide a constant velocity drive. Upon each such half-turn of the driven wheel 134, the gears 136, 137 act to rotate shaft 101 one full turn; and the differential gears 91, 92, 93 act to add or subtract two full turns to or from the rotation of the work spindle drive elements 89, 88, 87, 86, 84, etc. as compared with the rotation of the gear 93. The ratio of change gears 79 is so selected that this two-turn rotation causes the work gear on spindle 27 to be rotated by one circular pitch.

The gearing 104, 126, 127, 128 is of such ratio that the Geneva drive wheel 124 makes several turns, three in the embodiment shown, for each turn of main drive cam 102. In order that the index will operate only once during each turn of the cam, the driver 124 is shifted axially into and out of engageable relation with driven wheel 134 so that on only every third turn will its parts 129, 131, engage the wheel 134. The means for shifting the driver axially includes another continuous track, 141, on cam 102; a follower roller 142 engaged in the track and carried by a rock arm 143 pivoted at 144 to bracket 105 (Fig. 4); a link 145 pivotally connected arm 143 to a lever 146 that is fulcrumed at 147 to the bracket and at its upper end is pivotally connected to a shifter fork 148 by means of a link 149. The fork is slidable on a rod 151 supported by bracket 105 and its bifurcated ends engage in an annular groove 152 around the drive wheel 124.

For holding the shaft 101 and the Geneva driven wheel 134 stationary when they are not being driven by wheel 124, a dog 153 (Fig. 6) is arranged to seat in a notch in a disc 154 on shaft 101. The dog is on one end of a lever 155 that is pivotally supported by shaft 135 and has on its opposite end a roller 156 adapted to roll on either a cam surface 157 or an adjacent cylindrical surface 158 on drive wheel 124. The cam surface is of the same radius as the cylindrical surface for the major portion of its circumference but has a rise, shown in Fig. 6, for periodically swinging lever 155 clockwise to lift dog 153 out of the notch in disc 154. In Fig. 5 the roller 156 is on cylindrical surface 158 but when the wheel 124 is shifted axially, to bring its driving parts 129, 131 into the respective planes of rotation of surfaces 132 and 133, the roller will be on the cam surface 157.

The dog 153 is held engaged in the notch in disc 154 by a second lever, 159, pivotally supported on shaft 135 and a compression spring 161 which acts between the two levers. Lever 159 carries a roller 162 adapted to roll either on a cam surface 163 on wheel 124 or on an adjacent cylindrical surface 164. The cylindrical surface has the same radius as the cam surface 163 has for the major portion of its circumference, the remainder of the cam surface being of smaller radius. In Fig. 5 the cylindrical surface 164 is beneath the roller but the cam surface 163 is brought under it when the wheel is shifted to bring cam surface 157 under roller 156. The timing is such that the spring 161 always acts to hold the rollers against the wheel 124; that the lobe of cam 157 rocks lever 155 to lift the dog 153 from the notched disc 154 just before the drive parts 129, 131 engage the slot surfaces 132, 133 to rotate wheel 134 and shaft 101, and to allow the dog to again seat in notch of the disc (after the latter has made one complete turn) just before the parts 129, 131 leave the opposite end of the slot; and that the recessed surface of cam 163 allows lever 159 to swing to relieve the pressure of spring 161 just before cam 157 lifts dog 153, and to reapply the spring pressure to force the dog into the notch just before parts 129, 131 leave the opposite end of the slot.

The sequence of the several phases of the operating cycle of machine, which depends upon the shapes and phase relationships of the three cam tracks 106, 113 and 141, will now be described with reference to the cycle diagram, Fig. 12, and the diagrams of successive positions, Figs. 13, 14 and 15. Before operating the machine the cutter heads 38 are so adjusted on the cradle 28 that the cutters represent one tooth of the imaginary crown gear that is to generate the tooth spaces of the work gear; index gears 79 of the correct ratio to advance the work gear one circular pitch upon each index operation are installed; and there are also installed ratio-of-roll gears 94 of such ratio (depending upon the ratio of index gears 79) that the ratio of the angle of work spindle rotation to the angle of cradle rotation is approximately equal to the ratio of the number of teeth in the imaginary crown gear to the number of teeth in the work gear. There are also installed angle-of-roll change gears 112 in the ratio which will cause the cradle and work spindle to roll through only slightly greater angles than necessary to fully generate the profiles of the work gear teeth. The distance 116—117 of lever 115 is adjusted so that the full throw of cam track will advance the work head a distance slightly greater than the full depth of the teeth to be cut; and the work head 25 is so adjusted that the work gear on spindle 27 will be in the desired position of full-depth mesh with the imaginary crown gear when the infeed effected by cam track 113 is complete. The machine is automatically stopped, after each gear is completely cut, at the top of the up-roll of the cradle, i. e. with the cradle in its limit position of counter-clockwise movement (in the sense of Fig. 3), by a suitable automatic stop, not shown; and hence when the machine is idle the several cam tracks 106, 113 and 141 engage their respective follower rollers at line 165, Fig. 12.

To operate the machine the valve lever 123 is moved to cause the piston 119 to move against stop 122, thereby advancing the work into proximity to the tips of the cutters; and the main drive motor 47 is started, thereby causing the cutters 45 to rotate about their respective spindle axes 43' (Fig. 13) and also causing the cam 102 to rotate. At this time the cam track 141 is swinging the lever 146, clockwise in Fig. 4, and has shifted the Geneva drive wheel 124 into engageable relation with the driven wheel 134 but the parts 129, 131 have not yet reached the mouth of the slot in wheel 134. The cam track 113 is starting to act to withdraw the work head 25 away from the cutters, and the cam track 106 is starting the downroll (clockwise roll in Fig. 3) of the cradle. By the time the cam reaches the position shown at line 166, the parts 129, 131 engage the slot surfaces 132, 133 and the index operation therefore commences, while the downroll of the cradle continues. The indexing operation begins and ends slowly, is most rapid at its center. At the center, midway between lines 166 and 167, the cam track 113 has fully withdrawn the work from the cutters. Due to the pressure angle of the cutter blades the work is free of the cutters, so that indexing can start and end, when the work is somewhat less than fully withdrawn. Indexing is complete when the cam reaches position 167. At about this time track 141 begins to swing lever 146 counter-clockwise (in the sense of Fig. 4) to withdraw the index drive member 124 from engageable relation with driven member 134; the track 106 is at dwell, so that the generating downroll of the cradle and work spindle is stopped; and the track 113 starts the infeed of the work head relative to the cutters. At this time, when the cam is in position 167, the downroll has proceeded, as shown in Fig. 13, to a position 170 intermediate its top 168 and its middle 169. In the preferred embodiment this position of dwell occurs when the downroll is 30% complete, this percentage being selected because in the case of the average gear it will permit removal of the maximum amount of stock during the initial infeed that is consistent with leaving a fairly uniform distribution of stock for finish cutting. The broken lines 46' in Fig. 13 show the position of the cutter blades 46, relative to a finished tooth space 171 to be cut in the work gear G, at this time. To reach this position the tips of the cutter blades have followed the path 172 during the first 30% of the downroll, the cutters 45 rolling about the cradle axis 29 (clockwise in Fig. 3) while the work gear has rolled about its axis O (clockwise in Fig. 13).

The infeed effected by track 113 now takes place and continues until cam 102 reaches position 174, at which time the cutter blades are in their full-depth roughing position shown in full lines at 46 in Fig. 13. As there indicated, they have now removed the major part of the stock within the tooth space 171. Before this position has been reached, and when cam 102 is at position 173, the track 141 has ended its shifting of the index drive member 124 out of engageable relation to driven member 134, so that continued rotation of member 124 is now without effect. Beyond position 174 (considering now the extreme left side of Fig. 12) cam tracks 141 and 113 are at dwell and track 106 restarts the cradle downroll. The tips of the cutters now follow the path 175 to the bottom 176 of the downroll (Fig. 14) which occurs when the cam has reached position 177. At this time the relation of the cutters to the work is as shown by the full line position of the cutters 46 in Fig. 14. Only a small and nearly uniform thickness of stock now remains to be removed from the tooth space 171. This thickness along the tooth sides is greatly exaggerated in the drawings, and in practice may be only on the order of five-thousandths of an inch, except adjacent the tip of the bottom of the tooth space, in the zone, designated 178, which is not cut during the downroll but only during the initial depth feed.

At position 177 of the cam 102, the track 113 effects the slight further infeed of the work that is needed to cause the tools to cut to full depth, this being the position of the cutters shown by broken line 46' in Fig. 14. The uproll of the cradle now begins, with the track 113 remaining at dwell so that the tips of the tools follow the path 179. At position 181 the track 141 begins to shift the index drive member 124 into engageable relation with driven wheel 134. Finally, when one rotation of cam 102 is completed and position 165 reoccurs, the cradle uproll is complete and the tooth space has been completely generated. The relationship of the cutters to the work at this time is as shown in Fig. 15.

The machine will now repeat the cycle just described, and during each repetition will generate a successive tooth space. After all of the tooth spaces are cut the machine will stop automatically. By manual operation of valve lever 123 the piston 119 may be moved away from stop 122 by hydraulic pressure, thereby withdrawing the work head far enough from the cutters to enable dechucking the completed work gear from the spindle 27.

Having now described the preferred embodiment of our invention what we claim is:

1. A machine for generating gears comprising a movable carrier, a tool support and a rotatable work spindle of which one is mounted on the carrier, the tool support and the work spindle being relatively movable in a direction depthwise of the gear teeth to be produced, and a generating train connecting the work spindle and the carrier for relative rolling generating motion, characterized in that there is a means to operate said train alternately in opposite directions with a dwell at an intermediate point between the beginning and the mid-point of the motion in one direction, and means to relatively move the tool support and work spindle into nearly full depth position during said dwell and to complete said relative movement into full depth position at the end of said motion in one direction.

2. A machine according to claim 1 in which the last-mentioned means causes a relative withdrawal of the tool support and work spindle at the beginning of said motion in one direction, and in which there is a means for indexing the work spindle upon such withdrawal.

3. A machine according to claim 1 in which there is a unidirectionally rotatable cam having a separate cam track for operating each of said means.

4. A machine according to claim 1 in which said dwell occurs when said motion in said one direction is approximately thirty percent complete.

5. A machine according to claim 1 in which the tool support journals rotating cutter means having blades which simultaneously cut opposite sides of the same tooth space of the work.

6. A machine according to claim 1 in which the tool support journals a pair of disc cutters for rotation on relatively inclined axes, the cutters having radially extending blades, with the blades of each cutter extending into the inter-blade spaces of the other cutter.

7. The method of cutting a gear by a rolling generating motion in which the work is first cut during a generating roll in one direction and then is finished cut during the return roll, with a small relative infeed of the cutter and work after the first cut, characterized by an infeed to the full depth of said first cut during a dwell in the generating roll in said one direction at a point intermediate the beginning and the mid-point of said roll.

8. The method according to claim 7 in which said dwell occurs when the generating roll in said one direction is approximately thirty percent complete.

9. The method according to claim 7 in which there is a relative withdrawal of the cutter and the work after which the work is indexed, to bring a successive tooth surface thereof into cutting position, such withdrawal and indexing taking place during the generating roll in said one direction and preceding the infeed that occurs during said dwell.

10. The method according to claim 7 in which the cutting is accomplished by rotating cutter blades that simultaneously cut opposite sides of the same tooth space in the work.

11. The method according to claim 7 in which the cutting is accomplished by a pair of disc cutters arranged to rotate on relatively inclined axes and having radially extending blades, with the blades of each cutter extending into the inter-blade spaces of the other cutter.

12. A machine for generating gears comprising a movable carrier, a tool support and a rotatable work spindle of which one is mounted on the cradle, a generating train connecting the work spindle and cradle for relative rolling generating motion, a unidirectionally rotatable cam, means operable by the cam for oscillating the generating train, means connected to the generating train and including an intermittent drive mechanism having rotatable drive and driven members for periodically rotating the work spindle relative to the carrier, and means connecting the cam and the drive member for rotation, characterized by means also operable by the cam for periodically shifting the drive member axially into and out of engageable relation with the driven member.

13. A machine according to claim 12 in which the cam has a plurality of endless cam tracks thereon, the means for oscillating the generating train is operable by one of said tracks and the means for periodically shifting the drive member by another of said tracks.

14. A machine according to claim 12 in which the means for periodically shifting said drive member axially comprises a cam follower engaging another track of the cam, a shifter fork engaging said drive member, and a lever mechanism connecting the cam follower and the fork.

15. A machine according to claim 12 in which said means connected to the generating train for periodically rotating the work spindle relative to the carrier comprises a differential gear mechanism arranged in the generating train and having one of its elements connected to said driven member for rotation thereby.

16. A machine according to claim 15 in which there is a means for holding said driven member against rotation when it is not being driven by said drive member, the last-mentioned means including a cam follower and a cam on the drive member that is engageable with said follower when the drive member is in engageable relation with the driven member, and a cylindrical surface on the drive member engaging said follower when the drive member is out of engageable relation with the driven member.

17. A bevel gear cutting machine comprising a rotatable cradle, a pair of cutter heads adjustable to different positions on the cradle, and a cutter spindle journaled in each head and adapted to have detachably connected in keyed relation thereto one member of a pair of interlocking disc cutters; a cutter spindle drive gear train connecting said cutter spindles for rotation; and means for keying one cutter to its spindle in any one of a plurality of different angular position relative to the spindle to compensate for relative rotation of the spindles resulting from adjustments of the cutter heads on the cradle.

18. A bevel gear cutting machine comprising a rotatable cradle, a pair of guides carried by the cradle and adjustable thereon relative to each other about the cradle axis, a slide adjustable on each guide in a direction perpendicular to the cradle axis, a cutter head adjustable on each slide in a direction perpendicular to both the cardle axis and the direction of adjustment of the slide on its guide, and a cutter spindle journaled in each head on an axis inclined at an acute angle to the cradle axis, each spindle being adapted to have keyed thereto one member of a pair of interlocking disc cutters; a cutter spindle drive train including a drive shaft coaxial with the cradle, an intermediate shaft for each cutter spindle, each such intermediate shaft being supported by the related cutter head and having its axis parallel to the cradle axis, and toothed gearing connecting the drive shaft with the intermediate shafts, and connecting the intermediate shafts with the cutter spindles; and means for keying one cutter to its spindle in any one of a plurality of different angular positions relative to the spindle to compensate for relative rotation of the spindles resulting from adjustment of the guides relative to each other.

19. A machine according to claim 17 in which the keying means comprises a square key adapted to seat in a radial keyway in the cutter, said key having an eccentric bore, and a pin engaging in the bore and holding the key relative to the cutter spindle.

20. A machine for generating straight toothed bevel gears, comprising a rotatable cradle for carrying disc-shaped tools representing tooth sides of a generating gear, a pair of guides carried by the cradle and adjustable thereon relative to each other about the cradle axis, a slide adjustable on each guide in a direction perpendicular to the cradle axis, a cutter head adjustable on each slide in a direction perpendicular to both the cradle axis and the direction of adjustment of the slide on the related guide, and a tool spindle journaled in each head on an axis inclined at an acute angle to the plane of rotation of the cradle.

References Cited in the file of this patent

UNITED STATES PATENTS

| | | |
|---|---|---|
| 1,370,573 | Wingqvist | Mar. 8, 1921 |
| 1,474,500 | Wingqvist | Nov. 20, 1923 |
| 1,516,524 | Fellows | Nov. 25, 1924 |
| 1,588,560 | Trbojevich | June 15, 1926 |
| 1,965,224 | Ernst et al. | July 3, 1934 |
| 2,096,134 | Raber et al. | Oct. 19, 1937 |
| 2,107,460 | Wildhaber | Feb. 8, 1938 |
| 2,284,636 | Carlsen | June 2, 1942 |
| 2,289,583 | Malone | July 14, 1942 |
| 2,567,273 | Carlsen | Sept. 11, 1951 |
| 2,586,157 | Gasser et al. | Feb. 19, 1952 |
| 2,608,137 | Miller | Aug. 26, 1952 |
| 2,660,839 | Schicht | Dec. 1, 1953 |
| 2,725,792 | Wildhaber | Dec. 6, 1955 |
| 2,755,117 | Armitage | July 17, 1956 |